United States Patent
Wu et al.

(10) Patent No.: US 8,408,821 B2
(45) Date of Patent: Apr. 2, 2013

(54) VISIBLE AND INFRARED DUAL MODE IMAGING SYSTEM

(75) Inventors: Fei Wu, Los Gatos, CA (US); Shunbo Mou, San Jose, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 55 days.

(21) Appl. No.: 12/902,901

(22) Filed: Oct. 12, 2010

(65) Prior Publication Data

US 2012/0087645 A1 Apr. 12, 2012

(51) Int. Cl.
*G03B 17/00* (2006.01)
(52) U.S. Cl. .......................... 396/439; 348/342
(58) Field of Classification Search .................. 348/342
See application file for complete search history.

(56) References Cited

U.S. PATENT DOCUMENTS

| | | | |
|---|---|---|---|
| 6,621,199 B1 * | 9/2003 | Parfeniuk et al. | 313/231.51 |
| 6,642,955 B1 | 11/2003 | Midgley et al. | |
| 7,158,323 B2 | 1/2007 | Kim et al. | |
| 7,239,344 B1 | 7/2007 | Ikoma et al. | |
| 7,375,803 B1 | 5/2008 | Bamji | |
| 7,560,679 B1 * | 7/2009 | Gutierrez | 250/208.1 |
| 7,633,529 B2 | 12/2009 | Park | |
| 7,724,280 B2 * | 5/2010 | Gin et al. | 348/159 |
| 7,915,652 B2 * | 3/2011 | Lee et al. | 257/291 |
| 7,973,284 B2 * | 7/2011 | Chiang | 250/330 |
| 2006/0126194 A1 * | 6/2006 | Kazama | 359/811 |
| 2007/0001094 A1 * | 1/2007 | Rhodes | 250/208.1 |
| 2007/0272836 A1 | 11/2007 | Higashitsutsumi et al. | |
| 2007/0291157 A1 * | 12/2007 | Ding et al. | 348/360 |
| 2009/0128672 A1 * | 5/2009 | Watanabe | 348/273 |
| 2009/0159799 A1 | 6/2009 | Copeland et al. | |
| 2009/0215220 A1 * | 8/2009 | Toda | 438/87 |
| 2010/0245826 A1 * | 9/2010 | Lee | 356/425 |
| 2011/0228097 A1 * | 9/2011 | Motta | 348/164 |
| 2011/0228399 A1 * | 9/2011 | Ohnishi | 359/586 |

OTHER PUBLICATIONS

Abstract only, machine translation of Horikoshi et al. (JP 2009-220172 A).*
EP 11183940.3; European Search Report with Search Opinion mailed Sep. 7, 2012, 7 pages.

* cited by examiner

*Primary Examiner* — Rochelle-Ann J Blackman
*Assistant Examiner* — Linda B Smith
(74) *Attorney, Agent, or Firm* — Blakely Sokoloff Taylor & Zafman LLP

(57) ABSTRACT

An imaging system includes an image sensor and an optical filter. The image sensor captures image data in response to incident light. The optical filter filters the light and includes a dual window transmission spectrum. The dual window transmission spectrum includes a first transmission window having a first pass band aligned to pass visible light and a second transmission window having a second pass band overlapping with an absorption band of infrared light in Earth's atmosphere.

16 Claims, 8 Drawing Sheets

VISIBLE AND INFRARED DUAL MODE IMAGING SYSTEM

TECHNICAL FIELD

This disclosure relates generally to imaging systems, and in particular but not exclusively, relates to visible light and infrared light imaging systems.

BACKGROUND INFORMATION

Surveillance cameras are commonly used for monitoring an area under surveillance, which may be in a remote location. The still or video images captured by a surveillance camera may be monitored in real-time, recorded for later inspection, or both. A surveillance camera may be placed outdoor and operate 24 hours a day. During daytime, sunlight is the primary illumination source providing visible light. During nighttime, illumination is often provided by a manmade infrared light source. Accordingly, a surveillance system should be sensitive to visible light during the day and infrared light during the night.

However, sunlight contains both infrared radiation as well as visible light. Thus the captured images may contain both visible light images and infrared images, which may not be identical. During the day time, visible light only images are desirable. The captured infrared images, which interfere with visible light images, often introduce faulty color reproduction to visible light images and may reduce the clarity and quality of visible light images. During the night time, since only infrared light is present, which is provided by an infrared light source, only infrared images are captured. No visible light images are captured that may dramatically reduce the signal-to-noise ratio of the captured images.

One conventional approach to address the above problems of image degradation uses two dedicated cameras—one for capturing visible light images and the other for capturing infrared images. The visible light camera is provided with an optical filter for blocking infrared light while the infrared camera is provided with an optical filter for blocking visible light. The expense and complexity associated with two cameras is a disadvantage.

Another approach uses only one camera having a mechanical switch to select one of two optical filters. During the daytime, an optical filter blocking infrared light is moved into the optical path while an optical filter blocking visible light is removed from the optical path. During nighttime, the optical filter blocking infrared light is removed from the optical path and the optical filter blocking visible light is moved into the optical path. A disadvantage is that an expensive and failure prone mechanical switch is required to move optical filters.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method of operation for a visible and infrared dual mode imaging system are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Before entering Earth's atmosphere, the spectrum of sunlight resembles a 5250° C. blackbody spectrum covering wavelengths from approximately 200 to 2500 nm. As light passes through the atmosphere, some is absorbed by gases with specific absorption bands. Light at approximately 950 nm is absorbed by water in the atmosphere. Thus sunlight on the Earth's surface contains little or no light having wavelength's around 950 nm relative to the intensity of visible light present. The bandwidth of this water absorption band is approximately 50 nm substantially centered around the 950 nm wavelength.

Image sensors, based on silicon photodetectors such as complementary metal-oxide semiconductor ("CMOS") image sensors or charged-coupled devices ("CCD") image sensors, are sensitive to light having wavelengths starting from approximately 200 nm up to approximately 1100 nm. Accordingly, in sunlight a CMOS or CCD based image sensor, without any color or infrared filters ("IR") filters may detect images formed by light having wavelengths from 200 to 1100 nm.

A color image sensor comprises an array of photodetectors. Each photodetector is covered by a color filter. For example, the color filter may be one from a set of blue, green, and red color filters. In another example, the color filter set may be cyan, magenta, and yellow. These color filters are typically absorption filters having a pigment or dye. In addition to a specific color (e.g., blue, green, or red), an absorption filter is also transparent or partially transparent to infrared light having wavelengths longer than 700 nm. In many commercial and/or consumer video cameras, an additional infrared cut filter that blocks light having wavelengths larger than 700 nm is positioned in front of the image sensor such that the capture of infrared image data is prevented.

Figure 1:
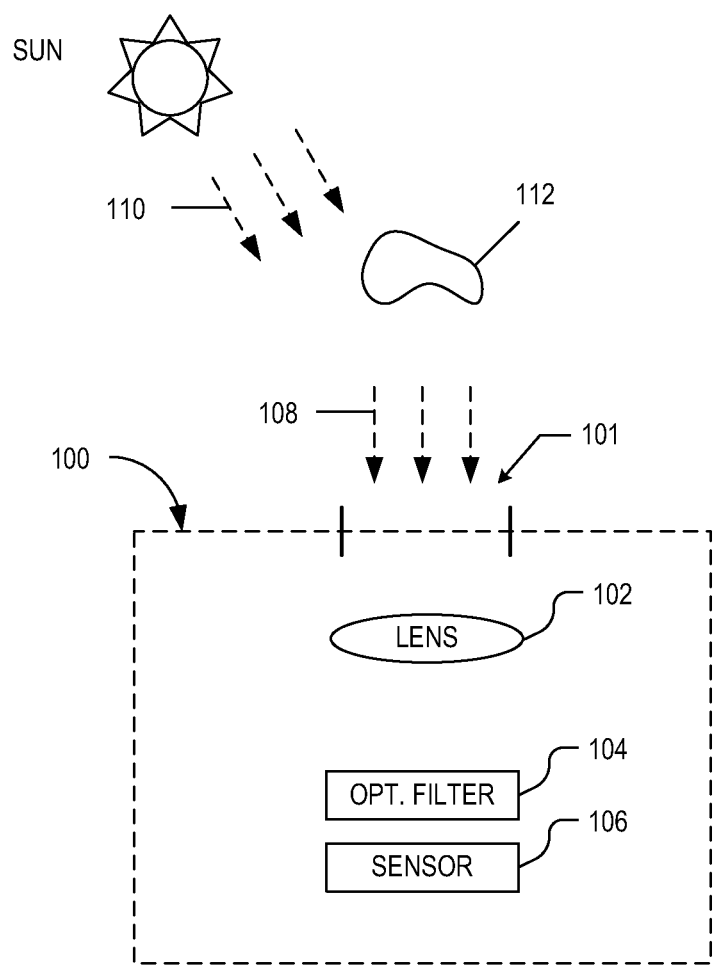
FIG. 1 is a functional block diagram illustrating a visible and infrared dual mode imaging system, in accordance with an embodiment of the invention.

FIG. 1 is a functional block diagram illustrating a visible and infrared dual mode imaging system 100, in accordance with an embodiment of the invention. The illustrated embodiment of imaging system 100 includes an aperture 101, a lens 102, an optical filter 104, and an image sensor 106. Image sensor 106 may be a CMOS or CCD type image sensor. Image sensor 106 may be a color image sensor having a color filter array ("CFA") of absorption type color filters. Lens 102 focuses or otherwise directs an image onto image sensor 106. During operation, sunlight 110 illuminates object 112, which is reflected as incident light 108 through aperture 101. Lens 102 directs incident light 108 through optical filter 104 onto image sensor 106. Optical filter 104 may be a separate distinct element from image sensor 106 or disposed on or integrated with image sensor 106. In either configuration, optical filter 104 is positioned such that incident light 108 passes through it before impinging on image sensor 106. For example, optical filter 104 may even be placed in front of or disposed on lens 102.

Figure 2:
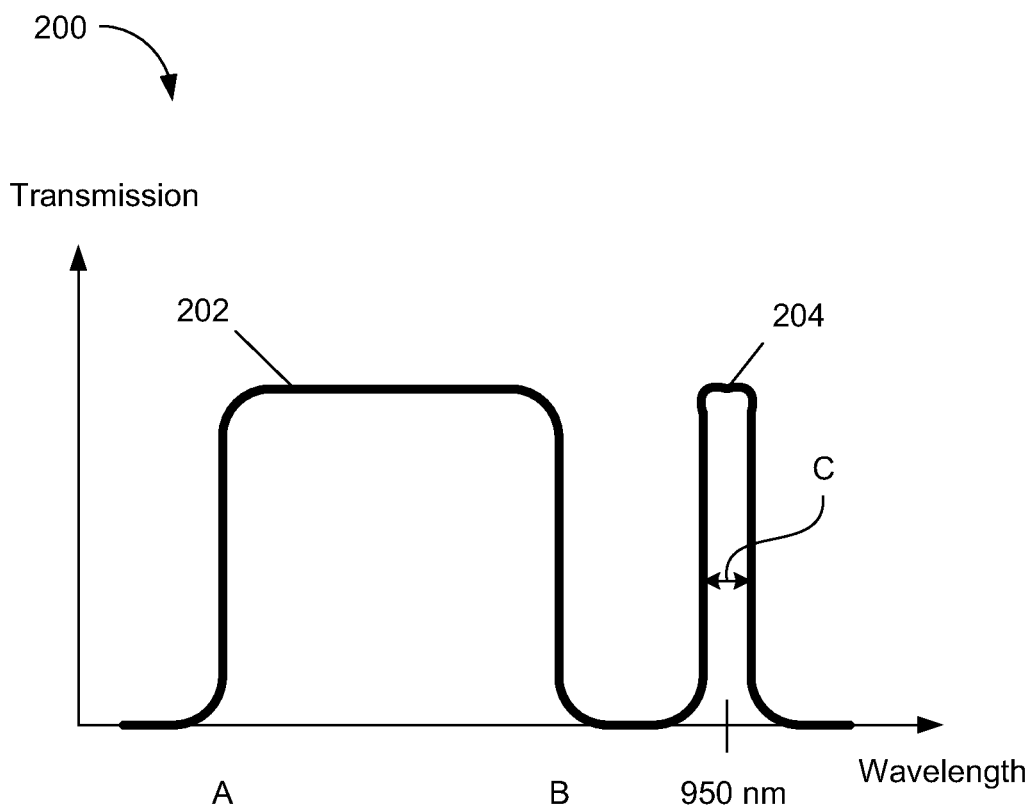
FIG. 2 is a chart illustrating a transmission spectrum of an optical filter, in accordance with an embodiment of the invention.

FIG. 2 is a chart illustrating a transmission spectrum 200 of optical filter 104, in accordance with an embodiment of the invention. Transmission spectrum 200 of optical filter 104 is a function of the wavelength of incident light 108. Transmission spectrum 200 includes two transmission windows 202 and 204. The first transmission window 202 includes a pass band defined between wavelengths A and B, which in one embodiment substantially corresponds to the visible spectrum. Wavelength A may range between 300 and 400 nm while wavelength B may range between 700 and 800 nm. The second transmission window 204 includes a pass band overlapping with an absorption band of infrared light in Earth's atmosphere. In one embodiment, transmission window 204 is centered approximately at 950 nm and has a bandwidth of C. In one embodiment, bandwidth C is equal to or less than the width of the absorption band of infrared light in Earth's atmosphere. For example, C may be approximately 50 nm. In some instances, bandwidth C may be larger than 50 nm depending on the application requirements. In the illustrated embodiment, transmission windows 202 and 204 are non-overlapping pass bands, while light outside of these pass bands is substantially attenuated.

Optical filter 104 may be implemented as interference filter having multiple thin films with varying refractive indices. Interference filters are typically constructed by depositing thin layers of specialized materials onto flat substrates. The basic structure of an interference filter often features alternating layers of high and low refractive index materials. For example, zinc sulfide (ZnS) having refractive index of 2.35 may be the high refractive index material and cryolite (Na3AlF6) having refractive index of 1.35 may be the low refractive index material. Some multi-layer thin film interference filter may include more than two types of materials. For example, other materials include: silicon oxide (SiO2, n=1.46), aluminum oxide (Al2O3, n=1.77), silicon nitride (Si3N4, n=2.02), tantalum pentoxide (Ta2O5, n=2.14), zirconium dioxide (ZrO2, n=2.22), yttrium oxide (Y2O3, n=1.93), etc. By careful selection of thickness and refractive index values for the various layers, controlled interference of light waves reflected at each layer interface can be utilized to enable the filter to reflect specific wavelengths while transmitting others. Although the layers are themselves colorless, the constructive and destructive interference as a function of wavelength results in the desired spectral transmission of the filter (such as transmission spectrum 200). The design and simulated performance of an interference filter are often performed using thin film design and simulation software. Commercially available software packages for designing interference filters include: Essential Macleod, TFCalc, OptiLayer, and FilmStar.

In visible mode (or daytime mode), imaging system 100 operates using sunlight. Visible light included within sunlight passes through optical filter 104 and is incident onto image sensor 106. If image sensor 106 is a color image sensor, a color image is captured. Infrared light having wavelengths larger than B is blocked or substantially attenuated by optical filter 104, except for the wavelengths falling within the second transmission window 204. However, as previously discussed, sunlight at the Earth's surface is relative devoid of these infrared wavelengths due to absorption by water vapor in the atmosphere. Thus, the visible spectrum is the overwhelming contributor to the image data relative to the infrared spectrum.

Figure 3:
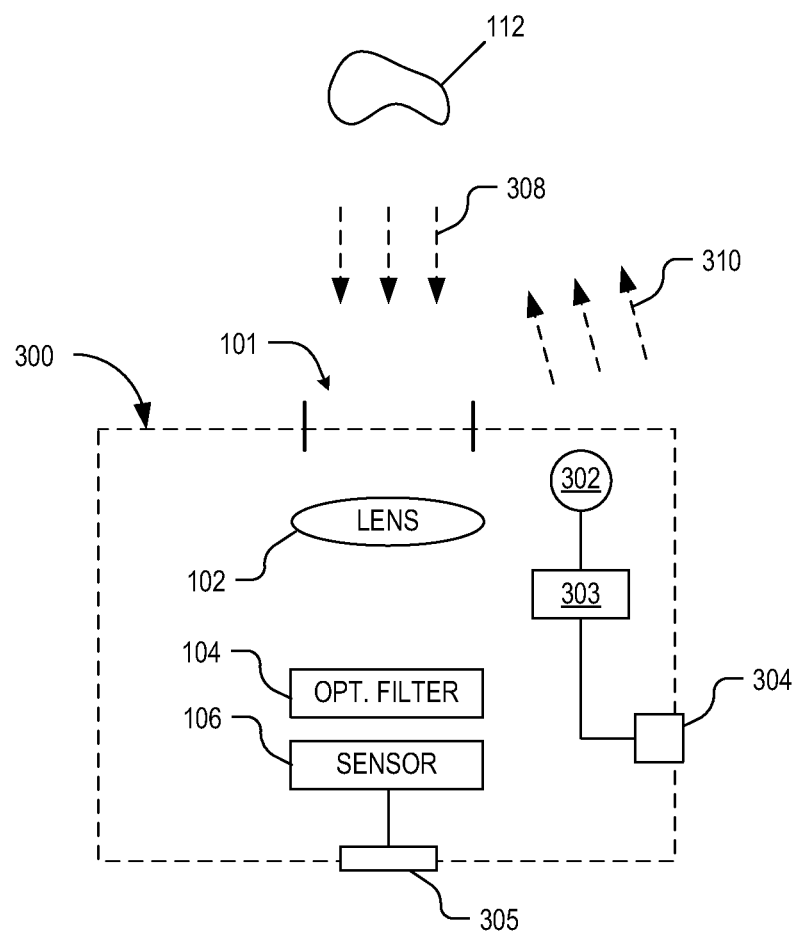
FIG. 3 is a functional block diagram illustrating a visible and infrared dual mode imaging system including an infrared light source, in accordance with an embodiment of the invention.

FIG. 3 is a functional block diagram illustrating a visible and infrared dual mode imaging system 300, in accordance with an embodiment of the invention. The illustrated embodiment of imaging system 300 includes aperture 101, lens 102, optical filter 104, image sensor 106, infrared light source 302, logic unit 303, day light sensor 304, and output port 305.

During daytime, infrared light source 302 is disabled and image sensor 106 collects visible spectrum image data as discussed above in connection with imaging system 100. During nighttime, infrared light source 302 is enabled to provide infrared illumination 310. In one embodiment, logic unit 303 uses a daylight sensor 304 to determine the luminance of the environment. Based on this luminance reading, logic unit 303 enables infrared light source 302 if it is determined to be nighttime and disables infrared light source 302 if sufficient daylight is determined. Infrared light source 302 may include a light emitting diode ("LED"), a group of LEDs, or other kinds of suitable light sources.

Infrared illumination light 310 illuminates object 112. An infrared incident light 308 is reflected from object 112 and enters imaging system 300 through aperture 101. Lens 102 directs incident infrared light 308 through optical filter 104 onto image sensor 106. As discussed below, infrared light source 302 generates infrared light that at least falls within the second transmission window 204 of optical filter 104. As such, this light is capable of passing through optical filter 104 to be captured by image sensor 106 as infrared image data. The infrared or visible image data may be output from the imaging system 300 via output port 305.

Figure 4:
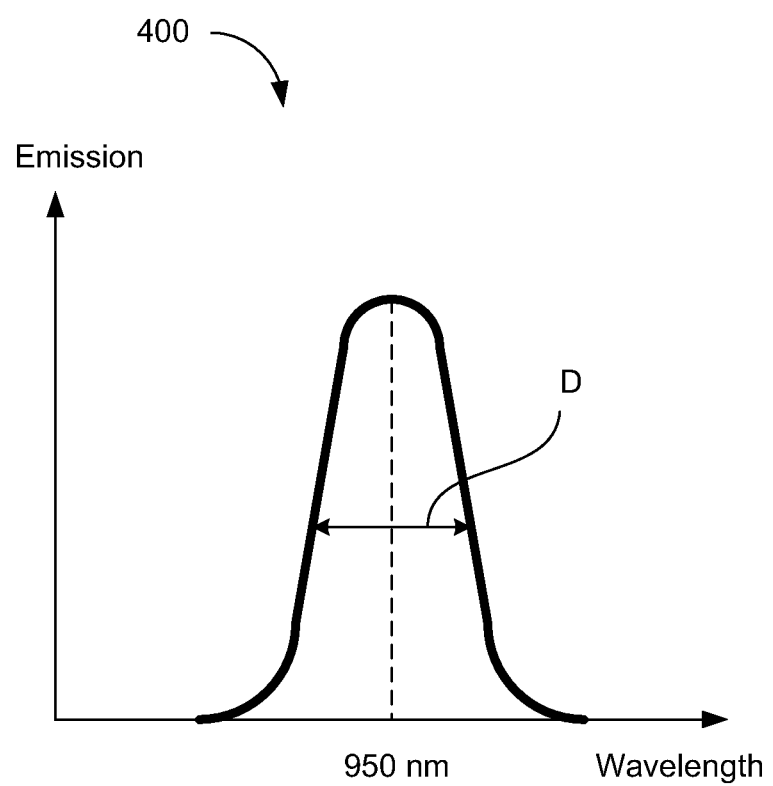
FIG. 4 is a chart illustrating a spectral emission of an infrared light source for a dual mode imaging system, in accordance with an embodiment of the invention.

FIG. 4 is a chart illustrating a spectral emission 400 of infrared light source 302 for dual mode imaging system 300, in accordance with an embodiment of the invention. In the illustrated embodiment, spectral emission 400 is centered about the 950 nm wavelength and has a bandwidth of D. D depends upon the type of LED employed in light source 302. For example, D may be approximately 50 nm. In other embodiments, spectral emission 400 may also emit longer infrared wavelengths that extend beyond the second transmission window 204, though these wavelengths will be attenuated by optical filter 104. However, infrared incident light 308 reflected from objects 112 under infrared illumination 310 and which falls within the second transmission window 204 will pass through optical filter 106. Since color filters of image sensor 106 are substantially transparent to infrared incident light 308, the captured infrared image data may appear as a black-and-white or grey scale image.

In one embodiment, bandwidth D of infrared light source 302 is equal or less than bandwidth C of second transmission window 204 of optical filter 104. Although C is normally equal or larger than 50 nm and D is also normally equal or larger than 50 nm, in some instances, D may be less than 50 nm, and accordingly C may also be less than 50 nm.

Imaging system 300 is well suited for operation as a 24 hour surveillance camera. During daytime, its spectral sensitivity is dominated by the first transmission window 202. During nighttime, its spectral sensitivity is dominated by the second transmission window 204. The first transmission window is defined from A to B, which is a visible light band. Wavelength A may be a wavelength between 300 and 400 nm and wavelength B may be a wavelength between 700 and 800 nm. The second window 204 may be centered at approximately 950 nm having a bandwidth of C. C may be approximately 50 nm.

Figure 5A:
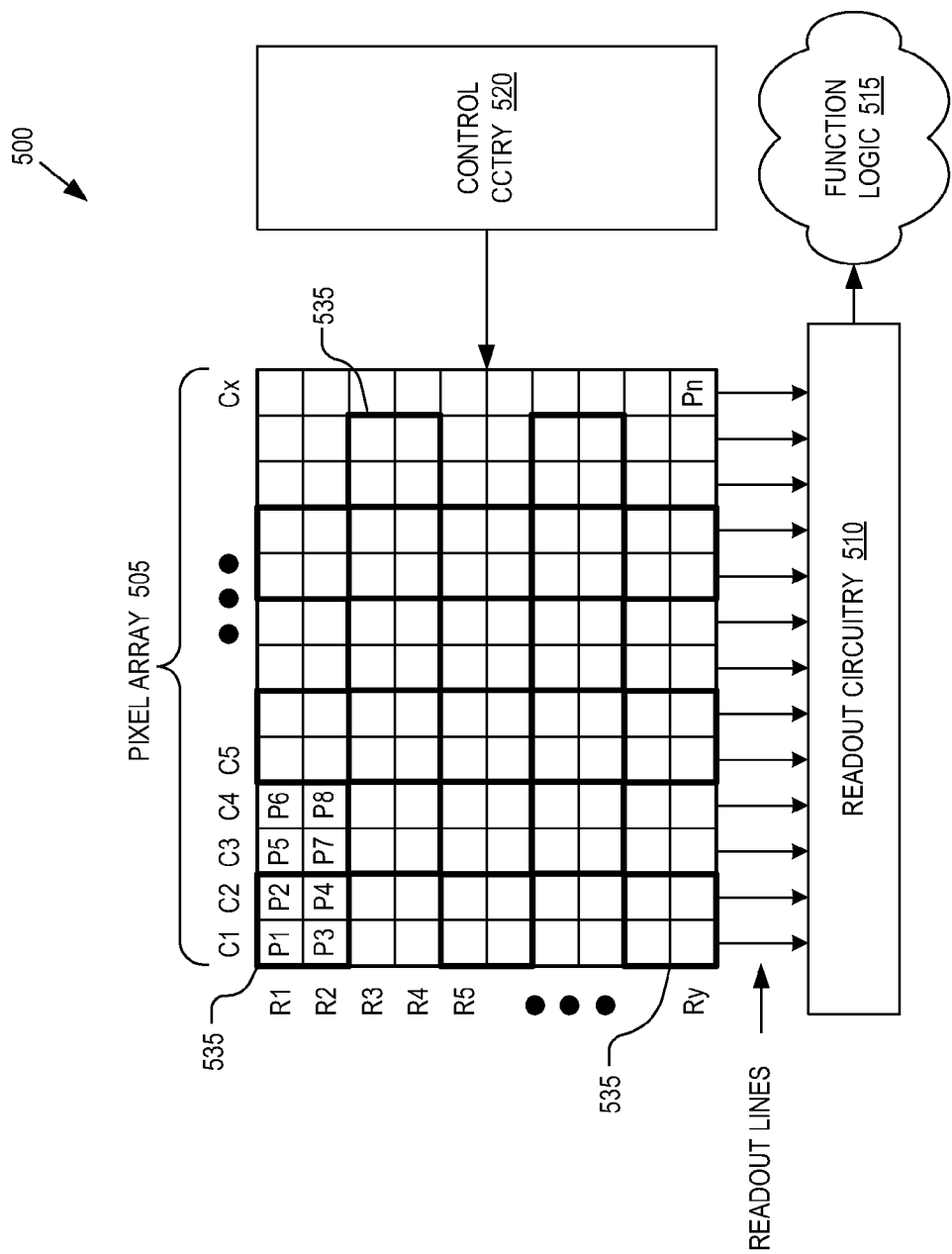
FIG. 5A is a functional block diagram of an image sensor, in accordance with an embodiment.

FIG. 5A is a block diagram illustrating an image sensor 500, in accordance with an embodiment of the invention. Image sensor 500 is one example implementation of image sensor 104. The illustrated embodiment of image sensor 500 includes a pixel array 505, readout circuitry 510, function logic 515, and control circuitry 520.

Pixel array 505 is a two-dimensional ("2D") array of an image sensor or pixels (e.g., pixels P1, P2 . . . , Pn). Each pixel may be a CMOS pixel or a CCD pixel. As illustrated, each pixel is arranged into a row (e.g., rows R1 to Ry) and a column (e.g., column C1 to Cx) to acquire image data of a person, place, or object, which can then be used to render a 2D image of the person, place, or object. In one embodiment, pixel array 505 is a backside illuminated ("BSI") image sensor. In one embodiment, pixel array 505 is a frontside illuminated ("FSI") image sensor. In one embodiment, pixel array 505 includes a color filter array ("CFA") disposed over the light incident side of the array, such as a Bayer pattern, a mosaic sequential pattern, or otherwise. The Bayer filter pattern is ordered with successive rows that alternate red and green filters, then green and blue filters—the Bayer filter pattern has twice as many green filters as red or blue filters.

After each pixel has acquired its image data or image charge, the image data is readout by readout circuitry 510 and transferred to function logic 515. Readout circuitry 510 may include amplification circuitry, analog-to-digital ("ADC") conversion circuitry, or otherwise. Function logic 515 may simply store the image data or even manipulate the image data by applying post image effects (e.g., crop, rotate, remove red eye, adjust brightness, adjust contrast, or otherwise). In one embodiment, readout circuitry 510 may readout a row of image data at a time along readout column lines (illustrated) or may readout the image data using a variety of other techniques (not illustrated), such as a serial readout or a full parallel readout of all pixels simultaneously.

Control circuitry 520 is coupled to pixel array 505 to control operational characteristic of pixel array 505. For example, control circuitry 520 may generate a shutter signal for controlling image acquisition. In one embodiment, the shutter signal is a global shutter signal for simultaneously enabling all pixels within pixel array 505 to simultaneously capture their respective image data during a single acquisition window. In an alternative embodiment, the shutter signal is a rolling shutter signal whereby each row, column, or group of pixels is sequentially enabled during consecutive acquisition windows.

Figure 5B:
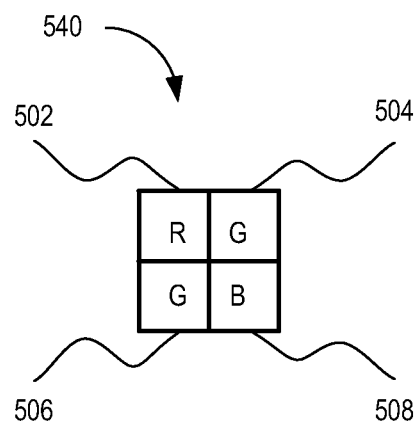
FIG. 5B is a block diagram illustrating a conventional Bayer pattern macropixel group of a pixel array.

FIG. 5B is a block diagram illustrating a conventional Bayer pattern macropixel group 540. As illustrated in FIG. 5A, macropixel groups 535 are repeated in a pattern over pixel array 505 and macropixel group 540 is one possible implementation of macropixel groups 535. Macropixel group 540 includes four pixel cells 502, 508, 504, and 506 corresponding to: a R pixel, a B pixel, and two G pixels. A single macropixel group produces a R signal, a G signal (the two G signals are typically combined), and a B signal. Each macropixel group 535 within pixel array 505 may be considered the smallest element of a color image produced by the color image sensor, where each macropixel group 535 corresponds to a single image pixel in the output image data. In other words, the resolution of the output image directly corresponds to the linear density of macropixel groups 535. The R, G, and B signals output by the individual pixel cells of a single macropixel group 535 are combined to form an individual color image pixel in the output color image data. It should be appreciated that other image sensors 500 may be overlaid by other types of CFAs that use a repeating pattern of macropixels composed of other color filter elements (e.g., cyan, magenta, yellow, etc.).

Figure 6:
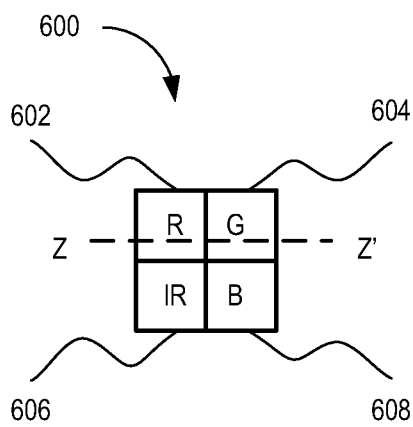
FIG. 6 is a block diagram illustrating a macropixel group including color pixels and an infrared pixel, in accordance with an embodiment of the invention.

FIG. 6 is a block diagram illustrating a macropixel group 600 including color pixels for capturing a visible spectrum image and an infrared pixel for capturing an infrared spectrum image, in accordance with another embodiment of the invention. Macropixel group 600 is a possible implementation of macropixel groups 535 of image sensor 500. However, macropixel group 600 integrates the dual window transmission spectrum feature of optical filter 104 into the CFA macropixels themselves. As such, an imaging system having a CFA implemented using macropixel group 600 need not also use optical filter 104.

The illustrated embodiment of macropixel group 600 includes an R (red) pixel 602, a G (green) pixel 604, a B (blue) pixel 608, and an IR (infrared) pixel 606. R pixel 602 is provided with a red color filter that passes red visible light. G pixel 604 is provided with a green color filter that passes green visible light. B pixel 608 is provided with a blue color filter that passes blue visible light. IR pixel 606 is provided with an element that passes infrared light. Macropixel group 600 includes a multi-layer optical filter that includes an infrared filter layer for filtering infrared light and a CFA layer including the repeating pattern of color filter elements for filtering different colors of visible light. The multi-layer optical filter is disposed over the light incident side of pixel array 505. In some embodiments, the CFA layer may be replaced with a black-and-white visible spectrum filter layer.

In a first embodiment (FIG. 7A), the infrared filter layer is a blanket filter layer 705 overlaying pixel array 710 including the photodetectors (e.g., photodiodes PD) and pixel circuitry (not illustrated). The blanket filter layer 705 covers both infrared pixels (IR) and color pixels (R, G, B). However, blanket filter layer 705 has transmission spectrum 200 with dual transmission windows. In one embodiment, blanket filter layer 705 comprises a multi-layer thin film interference filter. CFA layer 715 includes a repeating pattern of absorption type color filter elements overlaying the color pixels (R, G, B) and a clear or transparent planarization element overlaying the infrared pixels (IR).

Figure 7A:
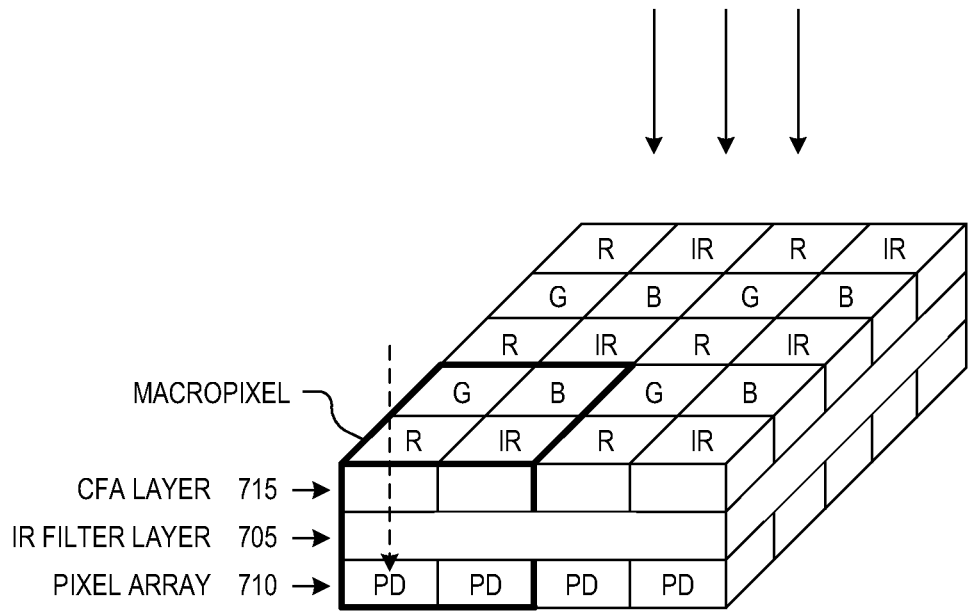
FIGS. 7A & 7B are perspective views of image sensors including multi-layered optical filter arrays, in accordance with embodiments of the invention.
Figure 7B:
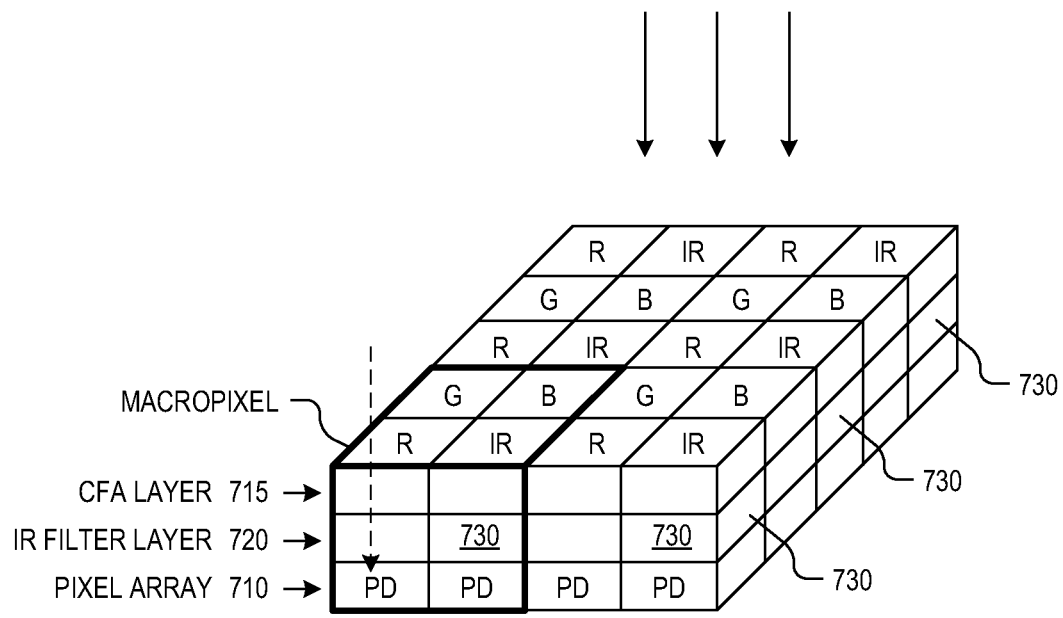

In a second embodiment (FIG. 7B), an infrared filter layer 720 overlays pixel array 710; however, infrared filter layer 720 is not a solid blanket layer, as in FIG. 7A. Rather, the portions 730 of infrared filter layer 720 aligned over the infrared pixels (IR) are transparent or clear planarization elements that pass both infrared and visible spectrum light. In some embodiments, portions 730 may be band pass filters or cut filters that pass specific infrared wavelengths. The remaining portions of infrared filter layer 720 aligned over the color pixels (R, G, B) are individual infrared cut filters that block all or substantially all infrared wavelengths while passing all or substantially all visible wavelengths. These infrared cut filters may be fabricated of IR absorption type material.

During daytime, the visible image data from the color pixels is used while the infrared image data from the infrared pixels is ignored. During nighttime, the infrared image data from the infrared pixels is used while the visible image data is ignored. Selectively parsing the pixel data may be accomplished directly via appropriate assertion of control signals by control circuitry 520 during readout. Alternatively, the selective parsing may be accomplished subsequently after all image data is readout from pixel array 505. In one embodiment, selective parsing of the image data may be achieved in software via function logic 515.

In the first embodiment of FIG. 7A, blanket filter layer 720 blocks the infrared wavelengths during daytime, except for the wavelengths falling within transmission window 204 (which are relatively insignificant due to atmosphere attenuation). At nighttime, blanket filter layer 720 permits infrared light emitted by infrared light source 302 to pass to the IR pixels. In the second embodiment of FIG. 7B, portions 730 of infrared filter layer 720 pass infrared light for nighttime vision, while the remaining portions block infrared light while passing visible light through the CFA layer 715 to generate visible color image data for daytime vision.

It should be appreciated that the order of the infrared filter layer and the CFA filter layer can be swapped. In some embodiments, CFA layer 715 is positioned below the infrared filter layer. Furthermore, embodiments of the present invention may be implemented with a variety of CFAs and is not limited to a Bayer pattern type CFA. For example, the color filter elements may include other colors such as magenta, cyan, yellow, or otherwise.

Figure 8:
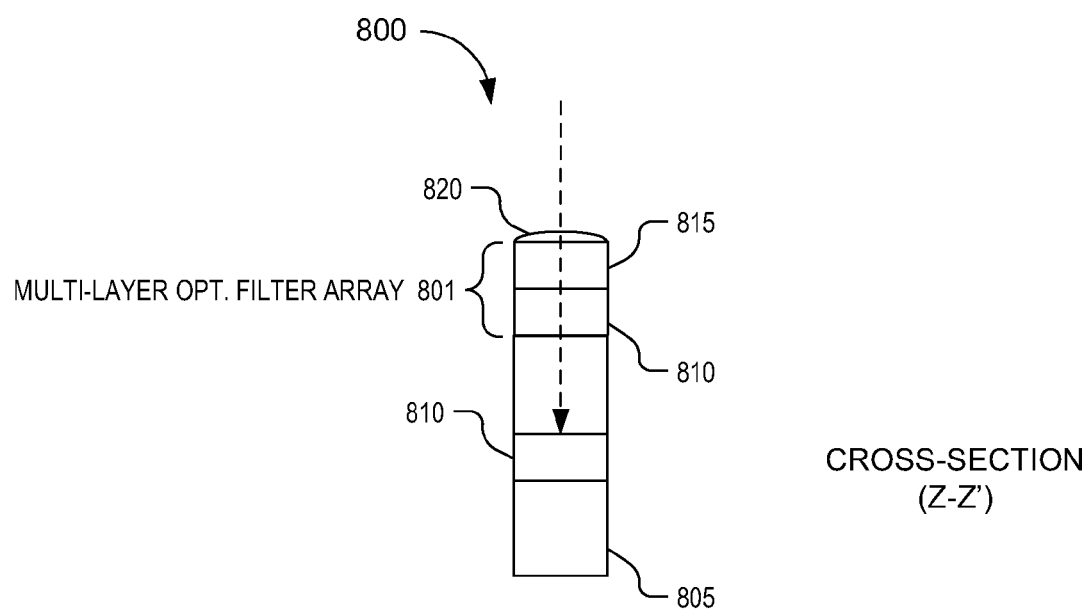
FIG. 8 is a cross-sectional view of an image sensor including a multi-layered optical filter array, in accordance with an embodiment of the invention.

FIG. 8 is a cross-sectional view of an image sensor pixel 800 including a multi-layered optical filter array 801, in accordance with an embodiment of the invention. Image sensor pixel 800 represents one possible implementation of a pixel cell within pixel array 505 or a cross-sectional view along line Z-Z' in FIG. 6. The illustrated embodiment of image sensor pixel 800 includes a semiconductor substrate 805, a photodetector 810 disposed within the semiconductor substrate 805, an infrared filter layer 810, a CFA layer 815, and a microlens 820. Together, infrared filter layer 810 and CFA layer 815 are referred to as multi-layer optical filter array 801. Various elements of a typical image sensor have been excluded from FIG. 8 so as not to clutter the drawings. For example, FIG. 8 does not illustrate pixel circuitry (e.g., transfer transistor, etc.) coupled to photodetector 810, metal layers, dielectric layers, insulating layers, etc. that may be disposed above and/or below photodetector 810.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An imaging system, comprising:
   an aperture for receiving incident light;
   an image sensor for capturing image data in response to the incident light; and
   an optical filter disposed between the aperture and the image sensor, wherein the optical filter includes a dual window transmission spectrum, the dual window transmission spectrum including:
      a first pass band aligned to pass visible light; and
      a second pass band overlapping with an absorption band of infrared light in Earth's atmosphere,
   wherein the optical filter comprises a single optical filter element including both the first and second pass bands such that a single ray of light incident on the single optical filter element is subject to both the first and second pass bands at a given time.

2. The imaging system of claim 1, wherein the optical filter substantially blocks infrared light outside of the second passband.

3. The imaging system of claim 1, wherein the optical filter comprises a multi-layer thin film interference filter.

4. The imaging system of claim 1, wherein the imaging system comprises a surveillance camera, the imaging system further comprising:
   an infrared light source to generate infrared light having a wavelength that falls within the second pass band.

5. The imaging system of claim 2, wherein the second passband is non-overlapping with the first passband.

6. The imaging system of claim 4, further comprising:
   a logic unit coupled to the infrared light source to enable the infrared light source during nighttime and to disable the infrared light source during daytime.

7. The imaging system of claim 5, wherein the second passband is approximately centered within the absorption band of infrared light in Earth's atmosphere and has a width equal to or less than the absorption band of infrared light in the Earth's atmosphere.

8. The imaging system of claim 6, further comprising:
   a lens disposed between the aperture and the optical filter; and
   a daylight sensor coupled to the logic unit to enable the logic unit to determine whether a current time is the daytime or the nighttime.

9. The imaging system of claim 7, wherein the second passband overlaps 950 nm and the width of the second passband is approximately 50 nm.

10. An apparatus, comprising:
    a pixel array for capturing image data in response to incident light, the pixel array including a repeating pattern of macropixels, wherein each macropixel includes multiple color pixels for capturing a visible spectrum image and an infrared pixel for capturing an infrared image; and
    a multi-layer optical filter array disposed over the pixel array, the multi-layer optical filter array including:
       an infrared filter layer for filter infrared light; and
       a color filter array layer including a repeating pattern of color filter elements for filtering different colors of visible light,
    wherein the infrared filter layer comprises a blanket filter layer overlaying the pixel array and covering both the color pixels and the infrared pixel of each macropixel, and wherein the infrared filter layer includes:
       a first pass band aligned to pass visible light; and
       a second pass band overlapping with an absorption band of infrared light in Earth's atmosphere to permit light falling within the absorption band of infrared light in Earth's atmosphere to pass through the multi-layer optical filter array to the pixel array, wherein the second pass band overlaps 950 nm and has a width equal to or less than the absorption band of infrared light in the Earth's atmosphere.

11. The apparatus of claim 10, wherein the infrared filter layer substantially blocks infrared light outside of the second pass band and wherein the second pass band is non-overlapping with the first pass band.

12. The apparatus of claim 10, wherein the infrared filter layer comprises a multi-layer thin film interference filter.

13. An apparatus, comprising:
a pixel array for capturing image data in response to incident light, the pixel array including a repeating pattern of macropixels, wherein each macropixel includes multiple color pixels for capturing a visible spectrum image and an infrared pixel for capturing an infrared image; and
a multi-layer optical filter array disposed over the pixel array, the multi-layer optical filter array including:
an infrared filter layer for filter infrared light; and
a color filter array layer including a repeating pattern of color filter elements for filtering different colors of visible light,
wherein the infrared filter layer includes:
a first portion aligned with the color pixels to block the infrared light and pass the visible light, wherein the first portion comprises an infrared cut filter; and
a second portion aligned with the infrared pixel to pass the infrared light, wherein the second portion of the infrared filter layer comprises a clear element.

14. A method of operating a dual mode imaging system, comprising:
receiving light at an optical filter having a dual window transmission spectrum, the dual window transmission spectrum including a first pass band aligned to pass visible light and a second pass band approximately equal to and limited by an absorption band of infrared light in Earth's atmosphere;
during daytime, passing the visible light through the first pass band to an image sensor while blocking the infrared light falling outside of the second pass band; and
during nighttime, passing the infrared light through the second pass band to the image sensor.

15. The method of claim 14, wherein the second passband is non-overlapping with the first pass band.

16. The method of claim 15, wherein the second pass band is approximately centered about 950 nm and has a width of approximately 50 nm.

* * * * *